(12) United States Patent
Naizer et al.

(10) Patent No.: US 9,038,865 B2
(45) Date of Patent: May 26, 2015

(54) APPARATUS AND METHODS FOR ASSISTING IN CONTROLLING THE DISCHARGE OF MATERIAL ONTO A CONVEYOR FROM A DISPENSER

(75) Inventors: Brent Naizer, Tomball, TX (US);
Ronnie Hughes, Montgomery, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 91 days.

(21) Appl. No.: 13/568,468

(22) Filed: Aug. 7, 2012

(65) Prior Publication Data
US 2014/0042191 A1    Feb. 13, 2014

(51) Int. Cl.
| B65D 47/00 | (2006.01) |
| B67D 3/00 | (2006.01) |
| B65D 90/58 | (2006.01) |
| B65G 47/19 | (2006.01) |
| B65G 69/04 | (2006.01) |

(52) U.S. Cl.
CPC ............ *B65D 90/587* (2013.01); *B65G 47/19* (2013.01); *B65G 69/0441* (2013.01)

(58) Field of Classification Search
CPC ................................ B65D 90/587; B61D 7/20
USPC ........ 222/559, 561, 181.1, 185.1; 141/11, 69, 141/81, 163; 198/550.2, 562, 532
See application file for complete search history.

(56) References Cited

U.S. PATENT DOCUMENTS

| 2,741,192 | A | * | 4/1956 | Dorey ...................... 105/282.3 |
| 3,170,609 | A | * | 2/1965 | Dorey ......................... 222/505 |
| 3,603,416 | A | | 9/1971 | Spurlin |
| 4,009,907 | A | * | 3/1977 | Stanfill ......................... 298/27 |
| 4,030,639 | A | * | 6/1977 | Parish et al. ............. 222/189.04 |
| 4,111,272 | A | | 9/1978 | Ricciardi et al. |
| 4,428,504 | A | * | 1/1984 | Bassett et al. ................... 222/55 |
| 4,475,669 | A | | 10/1984 | Wahl |
| 5,044,819 | A | | 9/1991 | Kilheffer et al. |
| 5,384,436 | A | | 1/1995 | Pritchard |
| 5,613,446 | A | * | 3/1997 | DiLuigi et al. ............. 105/282.2 |
| 5,767,455 | A | | 6/1998 | Mosher |
| 6,085,948 | A | * | 7/2000 | Putze ........................... 222/561 |
| 2008/0029546 | A1 | * | 2/2008 | Schuld ........................ 222/185.1 |
| 2008/0179054 | A1 | | 7/2008 | McGough et al. |
| 2008/0179324 | A1 | | 7/2008 | McGough et al. |

* cited by examiner

*Primary Examiner* — Paul R Durand
*Assistant Examiner* — Jeremy W Carroll
(74) *Attorney, Agent, or Firm* — E. Randall Smith; Jones & Smith, LLP

(57) ABSTRACT

In some embodiments, apparatus useful for assisting in controlling the discharge of material onto a conveyor from a material dispenser includes a carrier, first and second side restrictors extending downwardly from the carrier and at least one wiper extending downwardly from the carrier and transverse to the side restrictors. The side restrictors are configured to assist in preventing at least some material from overflowing off the sides of the conveyor, while the wiper is configured to level the top of at least some of the material dispensed on the conveyor.

20 Claims, 4 Drawing Sheets

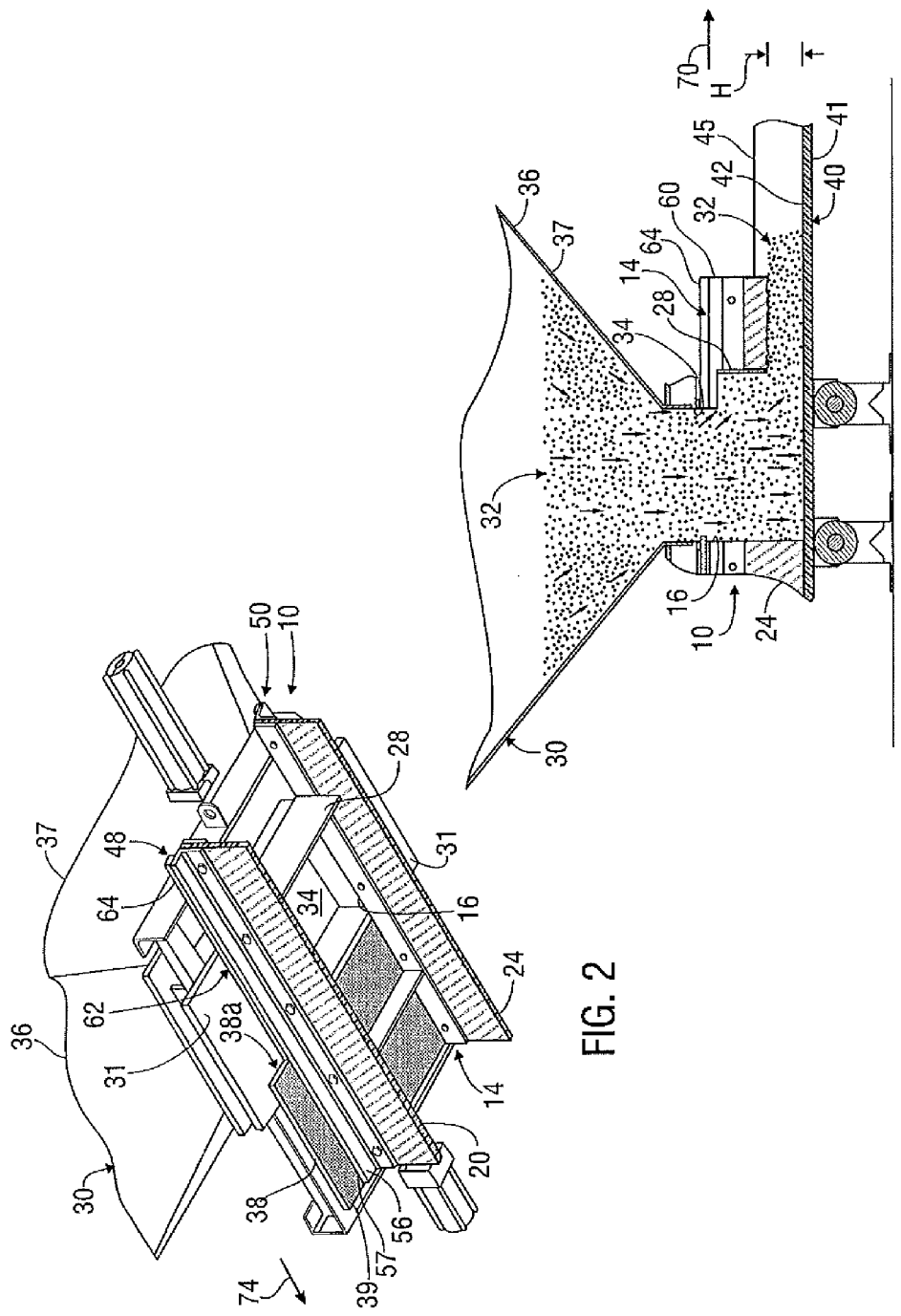

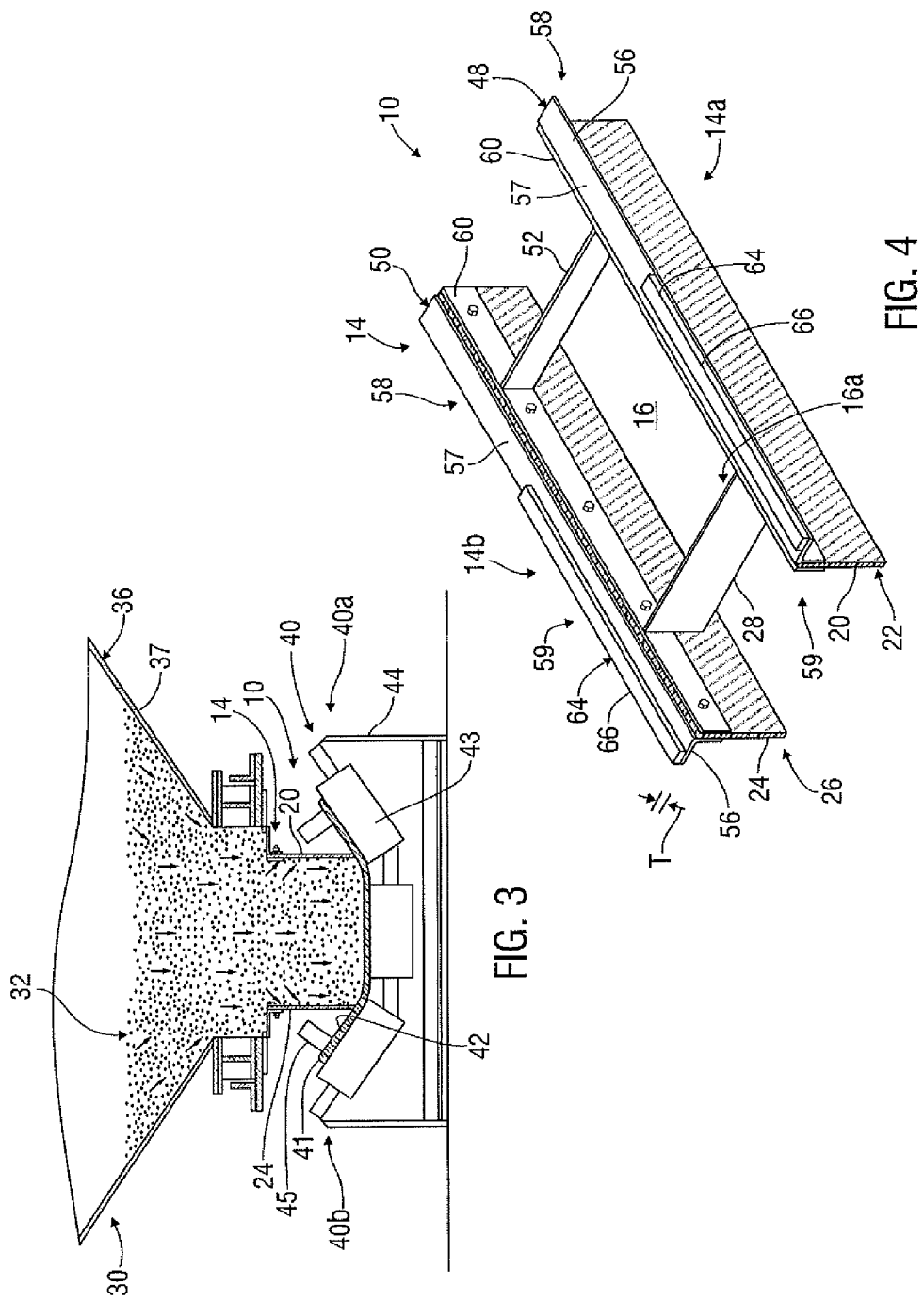

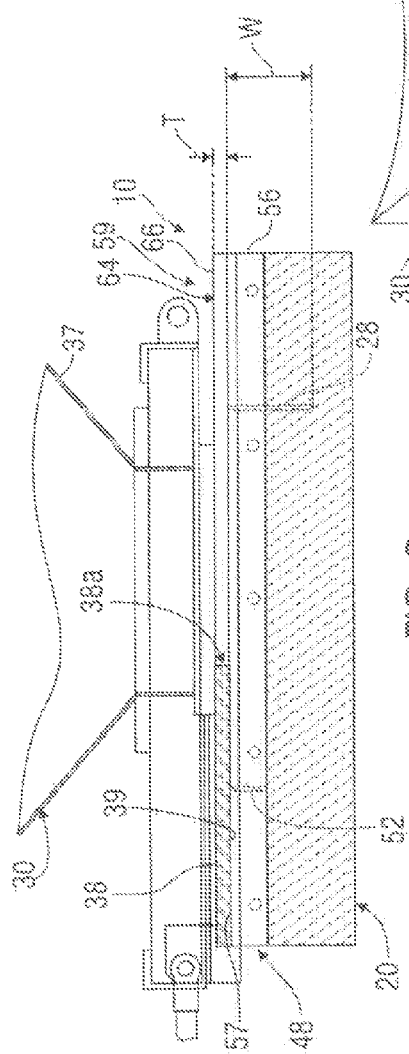
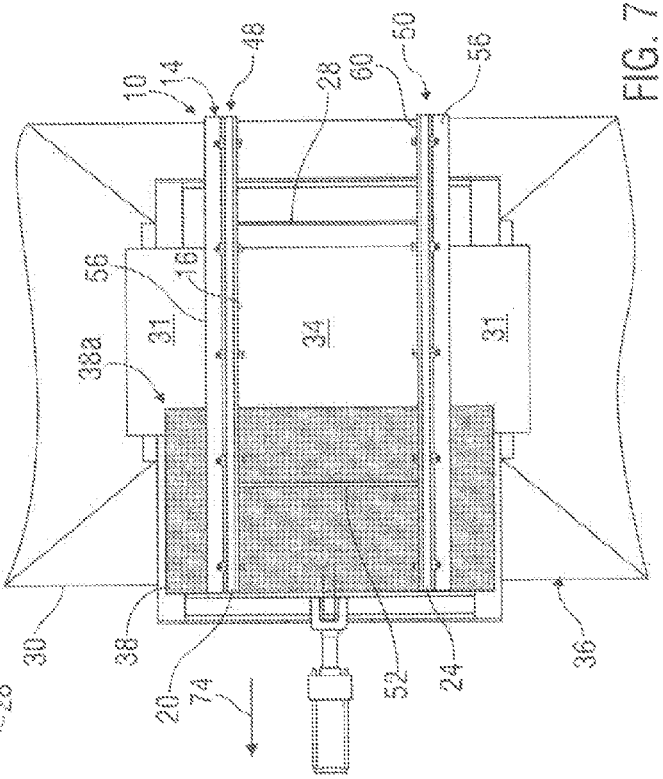

APPARATUS AND METHODS FOR ASSISTING IN CONTROLLING THE DISCHARGE OF MATERIAL ONTO A CONVEYOR FROM A DISPENSER

FIELD OF THE INVENTION

The present disclosure relates generally to material dispensing systems and, more particularly, to apparatus and methods for assisting in controlling the discharge of material onto a conveyor.

BACKGROUND OF THE INVENTION

Various industries involve systems for dispensing material, such as dry solids, onto conveying devices. In the hydrocarbon exploration and production industries, for example, materials are often dispensed from storage units onto conveyor belts for delivery to another location or system. One exemplary scenario often utilizing material storage units and conveyors is a hydraulic fracturing well site requiring the use of proppant or sand. In many frac job sites, a material storage unit, such as the Frac Sander by National Oilwell Varco, Inc, is used to dispense the sand or proppant onto a conveyor for delivery to another component, such as a blender.

Presently known systems and techniques for dispending material onto conveying devices may have one or more drawbacks. For example, as illustrated in FIG. 1, the material 32 often overflows off the sides of the conveyor 40 as it is being discharged from the dispensing unit 30. For another example, there is typically an insufficient barrier between the material dispenser and the conveyor to prevent wind or other external disturbances from displacing the material as it is being discharged onto the conveyor. Because it is often difficult or impossible to determine the actual volume of material ultimately carried by the conveyor, it is impossible to accurately meter or control the discharge rate onto the conveyor. In some instances, attempts are made to control the discharge rate by only slightly opening the discharge gate or varying the open position of the discharge gate, which can be difficult and ineffective. Also, the conveyor is often run at full or near-full speeds without interruption in order to deliver a sufficient quantity of material, causing significant undesirable friction, wear and dust.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the cited examples, features and/or disadvantages, merely because of the mention thereof herein.

Accordingly, there exists a need for improved systems, apparatus and methods useful to assist in controlling the discharge of material onto a conveyor having one or more of the attributes or capabilities described or shown in, or as may be apparent from, the other portions of this patent.

BRIEF SUMMARY OF THE DISCLOSURE

In some embodiments, the present disclosure involves apparatus useful for assisting in controlling the discharge of material onto a conveyor belt from a material dispenser. A carrier is slideably engaged with the material dispenser and movable into at least one open-flow position below the material dispenser and above the conveyor belt. The carrier in the open-flow position is configured to allow material to flow from the material dispenser onto the conveyor belt. First and second side restrictors extend downwardly from the carrier and longitudinally at least partially along opposing sides thereof. The side restrictors are configured to assist in preventing at least some material from overflowing off a respective corresponding side of the conveyor belt when the carrier is in an open-flow position and the material is being discharged from the material dispenser onto the conveyor belt. At least one wiper extends downwardly from the carrier and transverse to the side restrictors. The wiper is configured to level the top of at least some of the material dispensed on the conveyor belt as the conveyor belt moves relative to the material dispenser.

In many embodiments, the present disclosure involves an apparatus useful for assisting in controlling the discharge of at least one among sand and proppant onto a movable conveyor from a mobile sand storage unit at a hydrocarbon well drilling site. A carrier is slideably engaged with the mobile sand storage unit and movable into at least one open-flow position between the mobile sand storage unit and conveyor. The carrier, in an open-flow position, is configured to allow material to flow from the mobile sand storage unit onto the conveyor. First and second side restrictors extend downwardly from the carrier and longitudinally at least partially along opposing sides thereof. The side restrictors are configured to assist in preventing discharged material from overflowing off the sides of the conveyor. At least one wiper extends downwardly from the carrier and transverse to and between the side restrictors. The wiper is configured to level the top of the material dispensed on the conveyor as the conveyor moves relative to the mobile sand storage unit.

In various embodiments, the present disclosure involves a method of assisting in controlling the discharge of material from a material dispenser onto a conveyor belt located below the material dispenser with the use of a discharge control device. The material dispenser has a discharge opening and a gate slideably moveable relative thereto between gate-open and gate-closed positions. The discharge control device is engaged with the gate and extends off the front end thereof. The method includes moving the gate into a gate-open position, which causes the discharge control device to be positioned below the discharge opening of the material dispenser. Material is discharged from the material dispenser, through the discharge opening and at least one opening formed in the discharge control device and onto the conveyor belt. First and second spaced-apart side restrictors that extend downwardly from the discharge control device prevent at least some material from overflowing off the respective sides of the conveyor belt as material is being discharged onto the conveyor belt from the material dispenser. At least one wiper that extends downwardly from the discharge control device transverse to the side restrictors to a desired height above the conveyor belt levels off the height of the at least some of the material that is discharged onto the conveyor belt as the conveyor belt moves in a direction forward of the wiper.

Accordingly, the present disclosure includes features and advantages which are believed to enable it to advance material delivery technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 2 is a perspective view of an embodiment of a discharge control device in accordance with the present disclosure shown in a flow-open position relative to an exemplary material dispenser;

FIG. 3 is a rear view in partial cross-section of the exemplary discharge control device of FIG. 2 shown engaged with a material dispenser that is dispensing material onto a conveyor;

FIG. 4 is a perspective view of the exemplary discharge control device of FIG. 2;

FIG. 5 is a side view in partial cross-section of the exemplary discharge control device of FIG. 2 shown engaged with a material dispenser that is dispensing material onto a conveyor;

FIG. 6 is a side view of the exemplary discharge control device of FIG. 2; and

FIG. 7 is a bottom view of the exemplary discharge control device of FIG. 2.

DETAILED DESCRIPTION OF PREFERRED EMBODIMENTS

Figure 1:
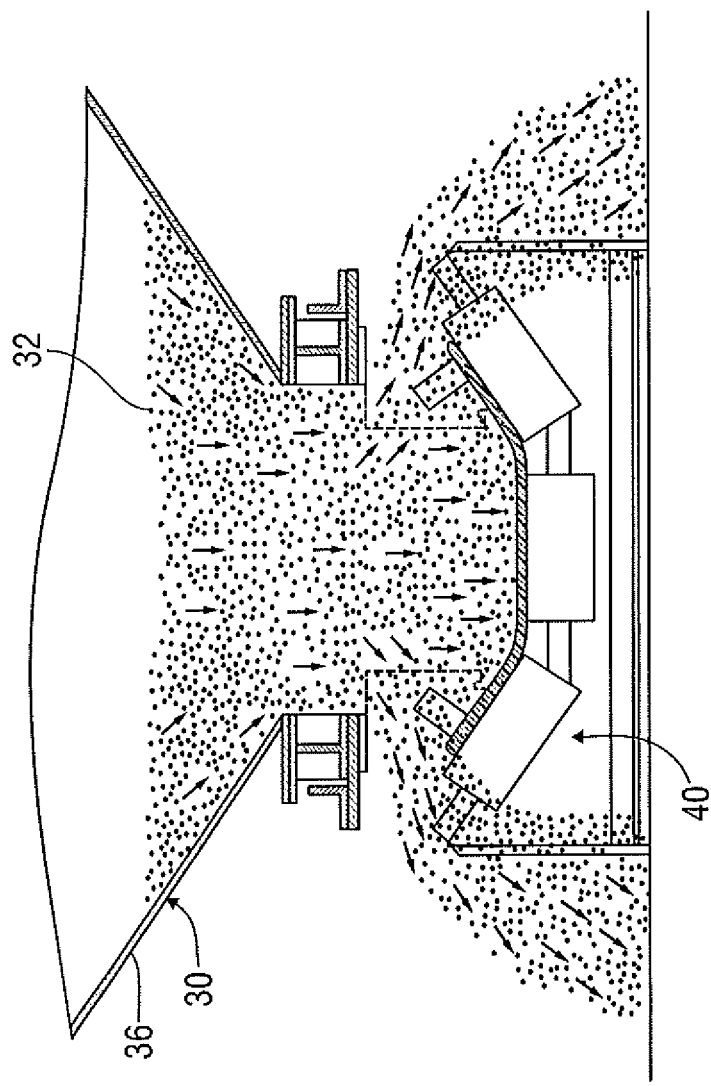
FIG. 1 is a rear view in partial cross-section of a prior art material dispenser shown dispensing material onto a conveyor.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring to FIG. 2, in accordance with an embodiment of the present disclosure, a discharge control device 10 is shown. In this example, the discharge control device 10 includes a carrier 14, first and second side restrictors 20, 24 and at least one wiper 28. The illustrated carrier 14 is associated with a material dispenser 30, which is used to dispense material 32 (FIG. 3) onto one or more conveyors 40 (FIG. 3). The exemplary carrier 14 is configured to be positioned below at least one dispenser opening 34 of the material dispenser 30 and above the conveyor 40 (FIG. 3), and includes at least one carrier opening 16 alignable below the dispenser opening(s) 34.

The material 32 may be any type of solids, or solid-liquid combination that can be discharged onto a conveyor 40. Some examples of materials 32 are dry solids, sand, proppant and dry additives, such as soy gum. The material dispenser 30 may be any type of device or system that can be used to dispense material 32 onto a conveyor 40. An example material dispenser 34 is a mobile sand conveying or storage unit 36 used in the oilfield industry, such as the Sand King or Frac Master by National Oilwell Varco, used on-site at drilling locations. For example, the mobile sand conveying unit 36 may be used to deliver proppant or sand to the well site. Typically, the mobile sand conveying unit 36 dispenses the proppant onto a moving conveyor belt for delivery to another component, such as a blender. A typical sand conveying unit 36 includes a hopper having multiple sand storage compartments 37 and multiple dispenser openings 34 associated therewith. A hydraulically-driven steel plate, or gate, 38 is laterally movable below each dispenser opening 34 to allow the discharge of material 32 therethrough. Some other examples of material dispensers 30 are horizontal and vertical sand silos, hopper systems or other equipment useful for discharging material onto one or more conveyor 40, and may be non-mobile or mounted on trailers or vehicles, stimulation vessels or other off-shore equipment. Likewise, the conveyor 40 may be any type of device or system that receives material 32 and delivers it to another location. For example, as shown in FIG. 3, the conveyor 40 may be a conventional conveyor belt system, typically including a belt 41 having a conveying surface 42 and side walls 45, multiple idler rollers 43 and a framework 44. However, the present disclosure and appended claims are not limited by the type, form, configuration, operation or other details of the material 32, material dispenser 30 or conveyor 40.

Referring now to FIG. 4, the illustrated side restrictors 20, 24 extend downwardly from the carrier 14 and longitudinally at least partially along opposing respective sides 14a, 14b thereof. As shown in FIG. 3, the illustrated side restrictors 20, 24 are capable of preventing material 32 from substantially overflowing off the corresponding respective sides 40a, 40b of the conveyor 40 as the material 32 is being dispensed thereon from the material dispenser 30. Referring back to FIG. 4, if included, the exemplary wiper 28 extends downwardly from the carrier 14 and perpendicular or transverse to the side restrictors 20, 24 at the front end 16a of the carrier opening 16. As shown in FIG. 5, the wiper 28 is capable of generally leveling the height H of the material 32 being dispensed onto the conveyor 40.

Still referring to FIG. 4, the carrier 14 may have any suitable form, configuration and operation. For example, the carrier 14 may include left and right side rails 48, 50 connected together with at least one cross bar 52 and engageable with the first and second side restrictors 20, 24 and wiper(s) 28 (see also FIG. 6). In the illustrated embodiment, the side rails 48, 50 each include an elongated angle iron 56 and corresponding elongated metal plate 60, which are bolted, or otherwise fastened, together over the proximal, or top, end of the corresponding side restrictor 20 or 24. The illustrated cross bar 52 and wiper 28 are connected with the side rails 48, 50, such as by weld, and the space between them forms the carrier opening 16. In other embodiments, more than one cross bar 52 and/or wiper 28 may be included and may form more than one carrier opening 16.

The carrier 14 may be associated with the material dispenser 30 in any suitable manner. Referring back to FIG. 2, in this embodiment, the carrier 14 is associated with the material dispenser 30 by being connected to and movable with the gate 38. For example, the upper surface 57 (FIG. 4) of the rear section 58 of each angle iron 56 may be mounted flush against the bottom 39 of the gate 38, such as by weld or other connection method. The remainder of the exemplary carrier 14 extends forward of the front 38a of the gate 38. The illustrated carrier 14 thus slides between positions along with movement of the gate 38. In this arrangement, as the gate 38 is moved rearward (arrow 74) relative to the dispenser opening 34, the carrier opening 16 becomes aligned under the dispenser opening 34.

Still referring to FIG. 2, if desired, a gap filler 64 may be included to fill all, or part of, the gap 62 that would exist between each side rail 48, 50 and the bottom surface(s) 31 of the material dispenser 30 adjacent to the dispenser opening 34 and forward of the gate 38. This may be useful, for example, to prevent the leakage or escape of material 32 through the gap 62. For example, a gap filler 64 may be provided on the front section 59 (FIG. 4) of each angle iron 56. The gap filler 64 may have any suitable form and configuration. In this embodiment, as shown in FIG. 4, each gap filler 64 is a flat bar 66 welded to the top surface of the front section 59 of each angle iron 56 and has a thickness T approximately equal to the thickness of the gate 38 (see FIG. 6). The illustrated flat bars 66 lie flush against the bottom surface 31 of the dispenser 30 adjacent to the dispenser opening 34. In other embodiments, for example, the gap filler 64 may instead be an integral part of the side rails 48, 50.

The side restrictors 20, 24 may have any suitable form, configuration and operation. In this embodiment, the side restrictors 20, 24 are positioned and sized so that, during use, they extend to, and contact, the conveying surface 42 (FIG. 3) of the conveyor 40 at a desired location on the width thereof. Depending upon the particular application, the side restrictors 20, 24 may be useful to prevent material 32 from overflowing off the respective sides of the conveyor 40 as the material 32 is being dispensed thereon, assist in preventing wind or other external influences from disturbing the desired discharge and distribution of material 32 onto the conveyor 40, help establish a uniform volume of material 32 being discharged onto the conveyor 40, one or more other purpose, or a combination thereof. The exemplary side restrictors 20, 24 are constructed of flexible material (e.g. elastomeric material), such as to prevent damage to the conveyor 40 due to contact therewith. In other embodiments, only a portion of the side restrictors 20, 24, such as the lower ends 22, 26 (FIG. 4), respectively, may be constructed of flexible material. In yet other embodiments, the side restrictors 20, 24 may not be configured to extend all the way to the conveying surface 42 of the conveyor 40 and may not be constructed of flexible material. For example, the side restrictors 20, 24 may be constructed of steel or any other desired material. Thus, the side restrictors 20, 24 may be designed to extend to any desired height over the conveyor 40. Likewise, the side restrictors 20, 24 may be designed to be positioned, during use, at any desired locations relative to the width of the conveyor 40. For example, in some applications, it may be desirable to retain the material 32 within a narrow width section on the conveying surface 42 of the conveyor 40. In some embodiments, the carrier 14 may be configured so that the position of one or both side restrictors 20, 24 is adjustable, such as to be able to adjust the position of the side restrictors 20, 24 relative to the conveyor 40.

The wiper 28 may likewise have any suitable form, configuration and operation. In this embodiment, the wiper 28 is a steel plate having (i) a length that substantially corresponds with the width section of the conveyor 40 upon which the material 32 will be dispensed, and (ii) a width W (FIG. 6) so that it extends down from the carrier 14 to a desired height H (FIG. 5) over the conveyor 40. The illustrated wiper 28 is configured so that, during operation, it will level off the top of the material 32 after it is dispensed from the material dispenser 30 and as the conveyor 40 moves in the direction of arrow 70. The exemplary wiper 28 is thus configured to establish a maximum height H of the material 32 on the conveying surface 42 of the conveyor 40. Depending upon the particular application, the wiper 28 may be useful to help establish a uniform volume of material 32 being discharged onto the conveyor 40, assist in preventing material overflow from the conveyor 40, one or more other purpose, or a combination thereof. For some types of materials 32, as the conveyor 40 continues to move in the direction of arrow 70, the material 32 may remain at height H based upon the self-bridging principal of sand. In some embodiments, the carrier 14 may be configured so that the position of the wiper(s) 28 is adjustable.

In an example operation of the illustrated embodiment, referring to FIG. 7, the gate 38 of the material dispenser 30 is opened, causing the carrier 14 to be moved into position between the dispenser opening 34 and conveyor 40 (FIG. 5). As shown in FIG. 5, material 32 is then discharged from the material dispenser 30 through the opening 34 and through the carrier opening 16. As the material 32 passes through the carrier opening 16 and onto the conveying surface 42 of the conveyor 40, the side restrictors 20, 24 prevent at least substantial overflow of material off the sides 40a, 40b (FIG. 3) of the conveyor 40. If included, the gap fillers 64 prevent leakage of material 32 through the gap 62 (FIG. 2). As desired, the conveyor 40 is moved in the direction of arrow 70. Concurrently with the movement of the conveyor 40, the wiper 28 levels off the top of the material on the conveying surface 42 at height H.

In this embodiment, if desired, since the volume of material 32 discharged and retained on the conveyor 40 is substantially known, the gate 38 of the material dispenser 30 may be moved to a fully open position and the dispenser opening 34 retained in a fully open state. The quantity of material 32 being delivered via the conveyor 40 may, if desired, be controlled and metered by controlling and, if necessary, varying the speed of the conveyor 40, providing improved material discharge and volume control. In many applications, the conveyor 40 may be moved slowly and often returned to a stop, while efficiently delivering the desired volume of material 32.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. Apparatus useful for assisting in controlling the discharge of material onto a conveyor belt from a material dispenser, the apparatus comprising:
    a carrier slideably engaged with the material dispenser and being movable relative thereto into at least one open-flow position below the material dispenser and above the conveyor belt, said carrier in said at least one open-flow position being configured to allow material to flow from the material dispenser onto the conveyor belt;
    first and second side restrictors mounted to said carrier and moveable therewith relative to the material dispenser, said side restrictors extending downwardly from said carrier and longitudinally at least partially along opposing sides thereof, said first and second side restrictors being configured to assist in preventing at least some material from overflowing off a respective corresponding side of the conveyor belt when said carrier is in said at least one open-flow position and the material is being discharged from the material dispenser onto the conveyor belt; and
    at least one wiper mounted to said carrier and moveable therewith relative to the material dispenser, said at least one wiper extending downwardly from said carrier and transverse to said first and second side restrictors, said at least one wiper being configured to level the top of at least some of the material dispensed on the conveyor belt as the conveyor belt moves relative to the material dispenser.

2. The apparatus of claim 1 wherein the material dispenser includes a discharge opening and a gate, the gate having a front end and being slideably moveable relative to the discharge opening between gate-open and gate-closed positions, wherein said carrier is engaged with said gate proximate to the front end thereof and extends forward of the gate therefrom, said carrier being configured to move into at least one said open-flow position when the gate is in a gate-open position.

3. The apparatus of claim 2 wherein said carrier includes a framework, said framework forming at least one carrier opening configured to align below the discharge opening of the material dispenser when said carrier is in at least one said open-flow position.

4. The apparatus of claim 3 wherein said framework includes first and second spaced-apart elongated side rails, each of said first and second elongated side rails having a respective elongated front section and an elongated rear section, said elongated rear sections of said elongated side rails being engaged with the gate and said elongated front sections extending foreword of the gate, further including first and second elongated gap fillers extending across the top of said elongated front sections of said first and second side rails, respectively, wherein when said carrier is in at least one said open-flow position, said elongated gap fillers are configured to occupy the space between the top of said front sections of said respective first and second elongated side rails and the material dispenser adjacent to the discharge opening thereof.

5. The apparatus of claim 4 wherein said gap fillers are formed with a thickness equal to the thickness of the gate.

6. The apparatus of claim 4 wherein said first and second side restrictors each have respective proximal and distal ends, wherein said proximal ends of said first and second side restrictors are engaged with said first and second elongated side rails, respectively, and when said carrier is in at least one said open-flow position, said distal ends of said first and second side restrictors are disposed proximate to the conveyor belt.

7. The apparatus of claim 6 wherein said distal ends of said first and second side restrictors abut the conveyor belt when said carrier is in at least one said open-flow position.

8. The apparatus of claim 7 wherein said first and second side restrictors are constructed of elastomeric material.

9. The apparatus of claim 1 wherein said first and second side restrictors constructed at least partially of elastomeric material.

10. The apparatus of claim 1 wherein the conveyor belt has a conveyor surface upon which the material is discharged from the material dispenser, wherein said at least one wiper is formed with a length so that said at least one wiper extends at least partially across the width of the conveyor belt and a width so that said at least one wiper extends to a desired height above the conveyor surface when said carrier is in at least one said open-flow position, wherein said desired height of said at least one wiper establishes the height of the material on the conveyor belt when material is discharged onto the conveyor belt from the material dispenser and the conveyor belt is moving in the direction forward of said at least one wiper.

11. The apparatus of claim 10 wherein each of said first and second side restrictors is configured to extend proximate to or along a respective side of the conveyor belt when said carrier is in at least one said open-flow position, further wherein said side restrictors are each formed with a width so that they will be located proximate to or abutting the conveyor surface when said carrier is in at least one said open-flow position, wherein said width of each of said first and second side restrictors is greater than said width of said at least one wiper.

12. The apparatus of claim 1 wherein the material is dry solids and the material dispenser is a mobile sand conveying unit useful at a hydrocarbon well drilling site, further wherein said carrier is constructed of steel and said first and second side restrictors are bolted to said carrier.

13. The apparatus of claim 12 wherein said first and second side restrictors and said at least one wiper are configured to be adjustable on said carrier, whereby the position of said first and second side restrictors and said at least one wiper relative to the conveyor belt is adjustable when said carrier is in at least one said open-flow position.

14. Apparatus useful for assisting in controlling the discharge of at least one among sand and proppant onto a movable conveyor from a mobile sand storage unit at a hydrocarbon well drilling site, the apparatus comprising:
a carrier slideably engaged with the mobile sand storage unit and being movable relative thereto into at least one open-flow position between the mobile sand storage unit and conveyor, said carrier in said at least one open-flow position being configured to allow material to flow from the mobile sand storage unit onto the conveyor;
first and second side restrictors mounted to said carrier and moveable therewith relative to the mobile sand storage unit, said side restrictors extending downwardly from said carrier and longitudinally at least partially along opposing sides thereof, said first and second side restrictors being configured to assist in preventing material from overflowing off a respective corresponding side of the conveyor when said carrier is in said at least one open-flow position as the material is being discharged from the mobile sand storage unit onto the conveyor; and
at least one wiper mounted to said carrier and moveable therewith relative to the mobile sand storage unit, said at least one wiper extending downwardly from said carrier and transverse to and between said first and second side restrictors, said at least one wiper being configured to level the top of the material dispensed on the conveyor as the conveyor moves relative to the mobile sand storage unit.

15. The apparatus of claim 14 wherein the mobile sand storage unit includes a discharge opening and a gate, the gate having a front end and being slideably moveable relative to the discharge opening between gate-open and gate-closed positions, wherein said carrier is engaged with said gate proximate to the front end thereof and extends forward of the gate therefrom, said carrier being configured to move into at least one said open-flow position when the gate is in a gate-open position.

16. The apparatus of claim 15 wherein said carrier includes a framework, said framework including at least one carrier opening configured to align below the discharge opening of the material dispenser when said carrier is in at least one said open-flow position, said framework also including first and second elongated side rails each having a respective elongated front section and an elongated rear section, said elongated rear sections of said elongated side rails being engaged with the gate and said elongated front sections extending foreword of the gate, further including first and second elongated gap fillers extending across the top of said elongated front sections of said first and second side rails, respectively, wherein when said carrier is in at least one said open-flow position, said elongated gap fillers are configured to occupy the space between the top of said front sections of said respective first and second elongated side rails and the adjacent to the discharge opening thereof.

17. The apparatus of claim 15 wherein said first and second side restrictors are constructed at least partially of elastomeric material and each have respective proximal and distal ends, wherein said proximal ends of said first and second side restrictors are engaged with said first and second elongated side rails, respectively, and when said carrier is in at least one said open-flow position, said distal ends of said first and second side restrictors abut the conveyor.

18. Method of assisting in controlling the discharge of material from a material dispenser onto a conveyor belt located below the material dispenser with the use of a discharge control device, the material dispenser having a discharge opening and a gate slideably moveable relative thereto between gate-open and gate-closed positions, the discharge control device being engaged with the gate and extending off the front end thereof, the method comprising:
moving the gate into a gate-open position, causing the discharge control device to move relative to the material dispenser into a position below the discharge opening of the material dispenser;
allowing material to be discharged from the material dispenser, through the discharge opening and at least one opening formed in the discharge control device and onto the conveyor belt;
first and second spaced-apart side restrictors mounted to the discharge control device and extending downwardly therefrom moving with the discharge control device relative to the material dispenser to a position that prevents at least some material from overflowing off the respective sides of the conveyor belt as material is being discharged onto the conveyor belt from the material dispenser; and
at least one wiper mounted to the discharge control device and extending downwardly therefrom transverse to the side restrictors moving with the discharge control device relative to the material dispenser to a desired height above the conveyor belt to level off the height of the at least some of the material that is discharged onto the conveyor belt as the conveyor belt moves in a direction forward of the at least one wiper.

19. The method of claim 18 further including varying the speed of the conveyor belt to control the volume of material discharged onto the conveyor belt.

20. The method of claim 18 further including at least one gap filler that is engaged with and extends partially across the top of the discharge control device preventing material from escaping through the gap between the discharge control unit and the material dispenser adjacent to the dispenser opening and forward of the gate when material is being discharged onto the conveyor belt from the material dispenser.

* * * * *